United States Patent
Love et al.

(10) Patent No.: US 7,729,715 B2
(45) Date of Patent: Jun. 1, 2010

(54) METHOD AND APPARATUS FOR POWER REDUCTION FOR E-TFC SELECTION

(75) Inventors: Robert T. Love, Barrington, IL (US); Richard C. Burbidge, Hook (GB); Edgar P. Fernandes, Winchester (GB); Vijay Nangia, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 959 days.

(21) Appl. No.: 11/323,190

(22) Filed: Dec. 30, 2005

(65) Prior Publication Data

US 2007/0155335 A1 Jul. 5, 2007

(51) Int. Cl.
*H04B 7/00* (2006.01)

(52) U.S. Cl. ........... 455/522; 455/67.11; 455/67.13; 455/500; 455/512; 370/336; 370/337

(58) Field of Classification Search ........... 455/522, 455/67.11, 67.13, 500, 512, 513, 517; 370/336, 370/337, 442, 347
See application file for complete search history.

(56) References Cited

U.S. PATENT DOCUMENTS

| | | | | |
|---|---|---|---|---|
| 6,192,040 | B1* | 2/2001 | Jalloul et al. | 370/335 |
| 6,654,922 | B1* | 11/2003 | Numminen et al. | 714/748 |
| 6,658,050 | B1* | 12/2003 | Ramesh et al. | 375/219 |
| 6,882,217 | B1* | 4/2005 | Mueller | 330/2 |
| 6,882,857 | B2* | 4/2005 | Zhang et al. | 455/522 |
| 7,313,117 | B2* | 12/2007 | Terry et al. | 370/335 |
| 7,321,780 | B2* | 1/2008 | Love et al. | 455/522 |
| 7,352,709 | B2* | 4/2008 | Wakabayashi | 370/278 |
| 7,408,895 | B2* | 8/2008 | Zhang et al. | 370/318 |
| 2003/0112786 | A1* | 6/2003 | Terry et al. | 370/342 |
| 2004/0043783 | A1* | 3/2004 | Anderson | 455/522 |
| 2005/0083897 | A1* | 4/2005 | Terry et al. | 370/338 |
| 2006/0023628 | A1* | 2/2006 | Uehara et al. | 370/232 |
| 2006/0111119 | A1* | 5/2006 | Iochi | 455/450 |
| 2006/0133313 | A1* | 6/2006 | You et al. | 370/329 |
| 2006/0176866 | A1* | 8/2006 | Wakabayashi | 370/342 |
| 2006/0217142 | A1* | 9/2006 | Inaba | 455/522 |
| 2006/0274783 | A1* | 12/2006 | Terry et al. | 370/465 |
| 2007/0036112 | A1* | 2/2007 | Chen | 370/335 |
| 2007/0115871 | A1* | 5/2007 | Zhang et al. | 370/318 |
| 2007/0286146 | A1* | 12/2007 | Kuroda et al. | 370/342 |
| 2008/0081651 | A1* | 4/2008 | Kuroda et al. | 455/509 |
| 2008/0096602 | A1* | 4/2008 | Terry et al. | 455/522 |
| 2008/0207251 | A1* | 8/2008 | Anderson | 455/522 |
| 2008/0273483 | A1* | 11/2008 | Zhang et al. | 370/318 |
| 2008/0298377 | A1* | 12/2008 | Amour et al. | 370/400 |

OTHER PUBLICATIONS

R4-51065, 3BPP TSG RAN4 Meeting#36, London, UK, Aug. 29-Sep. 2, 2005.
R4-050603, 3GPP TSG (Radio) Meeting #35, Athens, Greece May 9-13, 2005.
R4-050544, 3GPP TSG RAN WG4 (Radio) Meeting #35, Athens, Greece May 9-13, 2005.

* cited by examiner

*Primary Examiner*—Minh D Dao
(74) *Attorney, Agent, or Firm*—Ingrassia, Fisher & Lorenz, P.C.

(57) ABSTRACT

A method for data rate selection of a data transmission on a wide band code division multiple access (WCDMA) radio frequency (RF) channel in a portable communication device (100) is provided. The portable communication device (100) has transmitter circuitry (108) which includes a power amplifier (250). The method includes the steps of determining a power backoff requirement for the power amplifier (250) for a data transmission on a WCDMA channel (320) and selecting a transport format combination (TFC) for the data transmission in response to the power backoff requirement (324).

18 Claims, 3 Drawing Sheets

| CASE | INPUTS FOR SELECTION E-TFC MPR ||||||| E-TFC MPR CONSTRAINT |||
|---|---|---|---|---|---|---|---|---|---|---|
| | $\beta_c$ | $\beta_d$ | $\beta_{hs}$ | $\beta_{ec}$ | $\beta_{ed}$ | SF MIN | E-DPDCH N CODES | A CONSTRAINT | A TRUE MPR | A FALSE MPR |
| 1 | >0 | 0 | >0 | 0 | 0 | NA | 0 | NONE | 1.0 | 1.0 |
| 2 | >0 | 0 | 0 | >0 | >0 | >4 | 1 | $\beta_{ed}/\beta_c$<2 | 0.25 | 0 |
| 3 | >0 | 0 | 0 | >0 | >0 | 4 | 1 | $\beta_{ed}/\beta_c$<2 | 0.25 | 0 |
| 4 | >0 | 0 | ≥0 | >0 | >0 | 4 | 1 | $\beta_{ed}/\beta_c$<1 | 0.5 | 0 |
| 5 | >0 | 0 | ≥0 | >0 | >0 | 4 | 2 | $\beta_{ed}/\beta_c$<2 | 0.5 | 0 |
| 6 | >0 | 0 | ≥0 | >0 | >0 | 2 | 2 | $\beta_{ed}/\beta_c$<2 | 0.5 | 0 |
| 7 | >0 | 0 | 0 | >0 | >0 | 2 | 4 | $\beta_{ed}/\beta_c$<2.5 | 1.0 | 0.6 |
| 8 | >0 | >0 | >0 | >0 | >0 | ≥4 | 1 | $\beta_{ed}/\beta_c$<2 | 0.5 | 0 |
| 9 | >0 | >0 | ≥0 | >0 | >0 | 4 | 1 | NONE | 1.0 | 1.0 |
| 10 | >0 | >0 | 0 | >0 | >0 | 2 | 2 | $\beta_{ed}/\beta_c$<2 | 0.75 | 0.5 |
| 11 | >0 | >0 | >0 | >0 | >0 | 2 | 2 | $\beta_{ed}/\beta_c$<2.5 | 0.75 | 0.4 |
| 12 | >0 | >0 | >0 | >0 | >0 | 2 | 2 | NONE | 0.5 | 0.5 |

TABLE 1: INPUTS AND CRITERIA FOR SELECTING MPR FOR E-TFC SELECTION

*FIG. 4*

METHOD AND APPARATUS FOR POWER REDUCTION FOR E-TFC SELECTION

RELATED PATENT APPLICATIONS

The present invention relates to U.S. patent application Ser. No. 10/942,570, "Wireless Transmitter Configuration" filed on Sep. 16, 2004 with inventors Robert T. Love, Armin Klomsdorf, and Bryan S. Nollet published as United States Patent Publication 2006/0057978 A1 and Ser. No. 10/954,583, "Signal Configuration Based Transmitter Adjustment in Wireless Communication Devices" filed on Sep. 30, 2004 with inventors Armin Klomsdorf, Robert T. Love, Ernest Schirmann, and Dale Gerard Schwent published as United States Patent Publication 2006/0068830 A1.

FIELD OF THE INVENTION

The present invention generally relates to portable communication devices, and more particularly relates to a method and apparatus for a portable communication device to select enhanced transport format combinations (E-TFC) for power control of uplink wide-band CDMA (WCDMA) transmissions.

BACKGROUND

Today's portable communication systems set up communication among multiple portable communication devices and stationary base stations on a multitude of channels, where uplink transmissions are transmissions from the portable communication device to the base station and downlink transmissions are transmissions from the base station to the portable communication device. Some signaling protocols specify uplink transmissions on more than one channel, such as a control channel and a data channel. Thus, transmitter circuitry of a portable communication device can be transmitting on one or more adjacent channels, possibly leading to adjacent channel leakage. Accordingly, it is necessary to control the transmitter circuitry to avoid such issues.

In wide-band CDMA (WCDMA), the transmitter circuitry can be controlled to reduce adjacent channel leakage problems by performing rate selection which includes selecting the data rate and coding scheme (also known as Transport Format Combination (TFC) selection) for a signal transmission or burst to control the transmitter circuitry's power amplifier. In newer specifications for WCDMA, there are at least five channels that need to be supported for uplink transmission: a dedicated physical control channel (DPCCH), a dedicated physical data channel (DPDCH), a high speed dedicated physical control channel (HS-DPCCH), an enhanced dedicated physical control channel (E-DPCCH), and an enhanced dedicated physical data channel (EDPDCH). The rate selection for the enhanced uplink channels (E-DPCCH and EDPDCH) is referred to as enhanced transport format combination (E-TFC).

An appropriate E-TFC can be selected from the transmitter configuration characteristics of the transmitter circuitry by computing a maximum power reduction (MPR) for the waveform to be generated and the given transmitter configuration. Transmitter configurations can be characterized by one or more channels in the code, frequency, or time domain or any combination thereof and may include other attributes such as channel modulation type. For example, an uplink transmitter configuration for WCDMA may be characterized by two or more code channels with differing modulation, spreading factor, channelization code, and I or Q branch assignments. Thus, the number of transmitter configurations can be quite large, and each transmitter configuration has a corresponding MPR. In addition, over each transmission time interval (TTI) different transmitter configurations may be selected resulting in waveforms with different linear headroom requirements. Due to the large number of E-TFCs and transmission configurations, it is very complex for E-TFC selection to compute and store each E-TFC in real time. In addition, calculating all possible E-TFCs for all possible transmitter configurations off line and storing them in the portable communication device requires an enormous amount of memory.

Thus, what is needed is a method and apparatus for E-TFC selection which allows for power reduction on the uplink channel without being too complex for real time calculation or too memory intensive for storage of a table of all possible E-TFCs for all possible transmitter configurations. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

FIG. 4 is a table of minimum power requirements determined in response to various data rate selection criteria.

DETAILED DESCRIPTION

A method for data rate selection of a data transmission on a wide band code division multiple access (WCDMA) radio frequency (RF) channel in a portable communication device includes the steps of determining a power backoff requirement for a transmitter's power amplifier for a data transmission on a WCDMA channel and selecting a transport format combination (TFC) for the data transmission on the WCDMA channel in response to the power backoff requirement.

Figure 1:
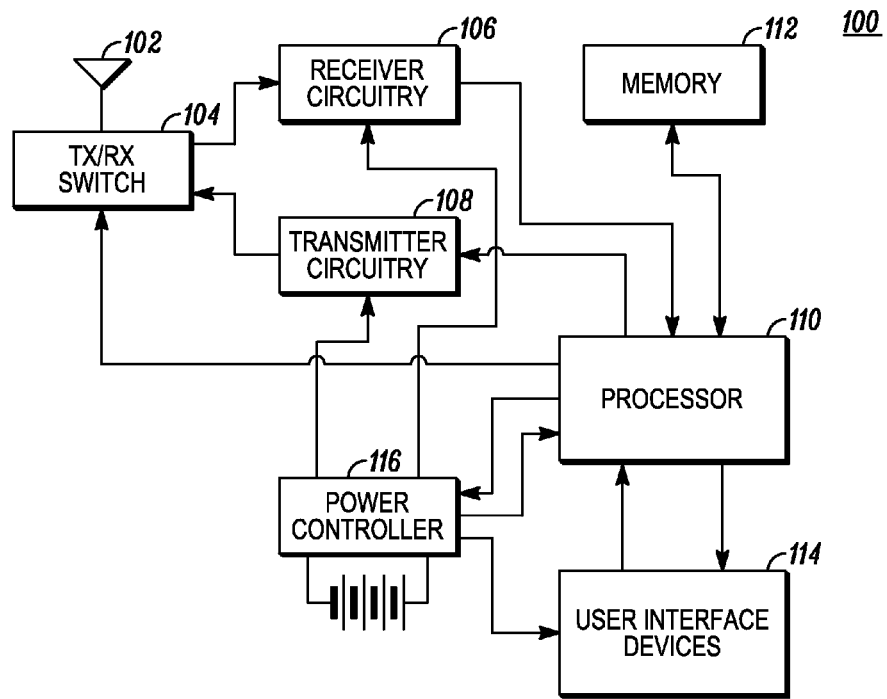
FIG. 1 is a block diagram of a portable communication device in accordance with an embodiment.

Referring to FIG. 1, a block diagram of a portable communication device 100, such as a cellular telephone (also known as "User Equipment (UE)" or a "Mobile Station"), is shown. The portable communication device 100 can also be implemented as a laptop computer with wireless connection, a personal digital assistant with wireless connection, and other wireless communication devices. The portable communication device 100 includes an antenna 102 for receiving and transmitting radio frequency (RF) signals. A receive/transmit switch 104 selectively couples the antenna 102 to receiver circuitry 106 and transmitter circuitry 108 in a manner familiar to those skilled in the art. The receiver circuitry 106 demodulates and decodes the RF signals to derive information and is coupled to a processor 110 for providing information for various function(s) of the portable communication device 100.

The processor 110 also provides information to the transmitter circuitry 108 for encoding and modulating information into RF signals for transmission from the antenna 102. The processor 110 is coupled to a memory device 112 and user interface devices 114 to perform the functions of the portable communication device 100. A power controller 116 is coupled to the components of the portable communication device 100, such as the transmitter circuitry 108, the processor 110, the receiver circuitry 106 and/or the user interface devices 114, to provide appropriate operational voltage and current to those components. The user interface devices 114 may include one or more user interface devices such as a microphone, a speaker, key inputs such as a keypad, and a display for displaying information to a user and which may also accept touch screen inputs.

Figure 2:
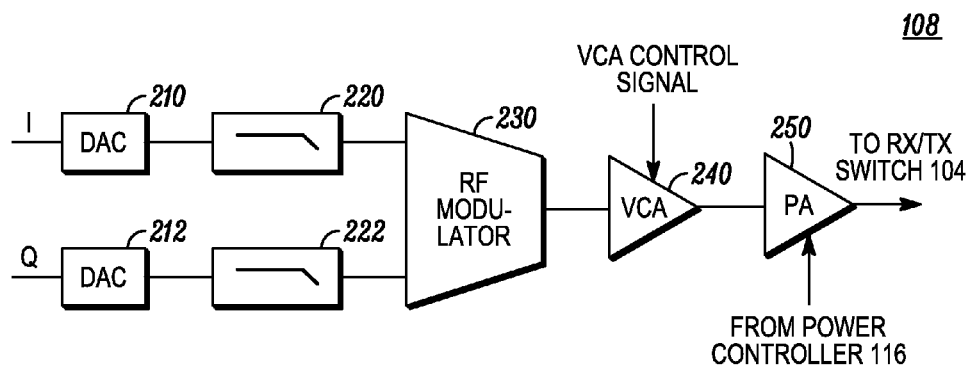
FIG. 2 is a block diagram of transmitter circuitry of the portable communication device of the communication system of FIG. 1 in accordance with the embodiment.

FIG. 2 shows a partial block diagram of the transmit feed-forward signal path of the transmitter circuitry 108. Signals from the processor 110 are provided to the quadrature feed-forward signal paths and enter the I and Q digital-to-analog converters (DACs) 210, 212. The output of the DACs 210, 212 is filtered through analog reconstruction filters 220, 222 and combined in a conventional RF modulator unit 230. The signals are then amplified through a voltage controlled attenuator (VCA) 240 under control of a VCA control signal from the processor 110 and provided to a power amplifier (PA) 250. The PA 250 operates under the control of a power signal from the power controller 116 which varies in response to a control signal from the processor 110. The amplified signal from the PA 250 is provided to the transmit/receive switch 104 for transmission from the antenna 102.

Figure 3:
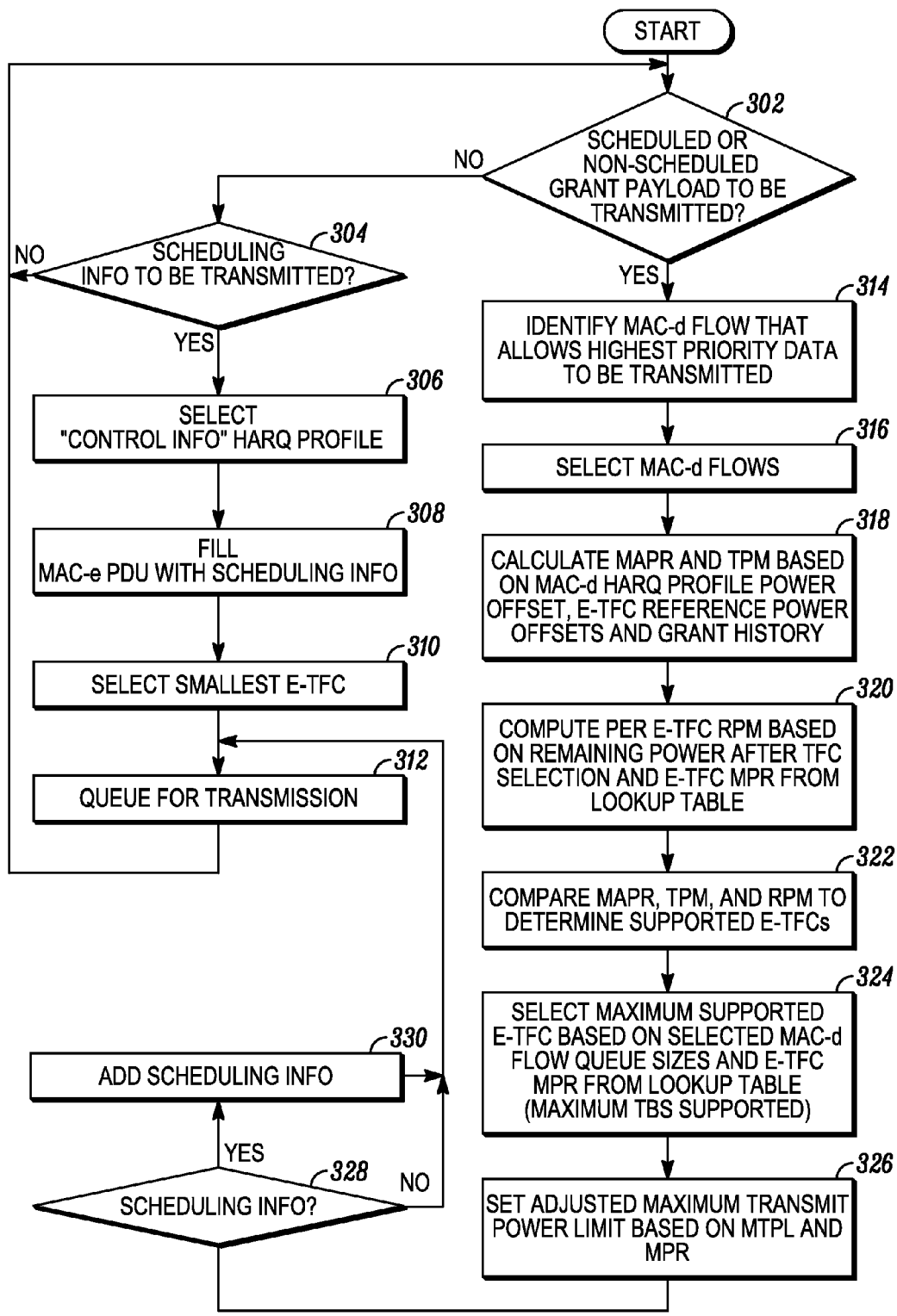
FIG. 3 is a flowchart of the process for selection of enhanced transport format combinations (E-TFC) of the portable communication device of FIG. 1 in accordance with the embodiment.

In radio systems utilizing packet-switched connections, such as the Wide band Code Division Multiple Access (WCDMA) or the Universal Mobile Telecommunications System (UMTS), the packets are transmitted separately with transport format combinations (TFC) defining power control for the PA 250 when transmitting the packets. Referring to FIG. 3, a flowchart of the process for power control of uplink WCDMA transmissions in accordance with the embodiment is shown.

The output power level of the PA 250 is not allowed to exceed the maximum communication device transmission power limit or maximum transmission power limit (MTPL), i.e., the maximum power level at which the PA 250 can support a waveform generated with a reference transmitter configuration while meeting specified or targeted Adjacent Channel Leakage Ratio (ACLR) requirements. In WCDMA the maximum transmission power level (MTPL) is based on the UEs power class where one such class has a MTPL of 24 dBm. MTPL is also referred to as $P_{MAX}$. Preventing the output power level of the PA 250 from exceeding the MTPL is achieved by scaling the input waveform entering the PA 250 or changing the gain levels in the PA 250 itself, as necessary. Maintaining a power amplifier's ACLR levels within a specified limit also requires input waveform power level variations to remain substantially within the power amplifier's linear range to avoid non-linear distortion (e.g., to avoid $3^{rd}$ order intermodulation products). Different transmit waveforms generated from different transmitter configurations can require different amounts of power amplifier (PA) 250 linearity or linear headroom.

Two metrics useful for indicating a power amplifier's linear headroom are the 99.9 percentile peak to average power ratio (PAR) and the cubic metric (CM). Over each transmission time interval (TTI) (i.e., the time required to send a packet) different transmitter configurations may be selected resulting in waveforms with different linear headroom requirements. Variations in PAR or CM for different waveforms reflect different PA 250 linear headroom needs to meet a required ACLR limit. Given a reference waveform and transmitter configuration with corresponding PAR or CM, and known achievable maximum PA 250 power level (MTPL), then the difference of PAR or CM values of other configurations relative to the reference values indicate the increase or decrease in linear headroom requirements of the PA 250. Alternately, given a reference waveform and transmitter configuration with corresponding PAR or CM, and known achievable maximum PA 250 power level and given a fixed linear headroom, then the difference of PAR or CM values of other configurations relative to the reference values indicate the increase or decrease in maximum PA 250 power level needed to maintain the same ACLR level.

When choosing a data rate and coding scheme (i.e. performing rate selection) for a signal transmission or burst over a wireless channel for any given transmitter configuration, it is necessary to compute a maximum power reduction (MPR) based on the generated waveform for the given transmitter configuration. The MPR is applied to the maximum transmission power limit (MTPL) (or used to adjust the MTPL) to form a modified MTPL which is used during the transmission of the corresponding waveform thus ensuring that ACLR levels stay within a specified or targeted limit.

The MPR can be computed by computing the CM of a waveform generated for a specific transmitter configuration. The number of transmitter configurations can be quite large and each configuration has a corresponding MPR. Since each waveform can be known some time before it is transmitted during the rate selection process, where the data rate, coding scheme, and transmitter configuration are determined then the MPR can be computed and applied to the PA 250 in time for transmission of the waveform.

During rate selection (or transmit format combination (TFC) selection) it is useful to know what MPR will be applied to the MTPL to form the modified MTPL. This is because during rate selection an estimate of the available or remaining power at the next or future transmission time interval is used to compute a transmitter remaining power margin (RPM). The RPM is based on the MTPL of the PA 250 and can include knowledge of the current power level estimate of some reference channel such as a pilot channel (e.g., the DPCCH channel). The RPM can also account for the MPR needed for a given E-TFC in which case the RPM is E-TFC dependent. WCDMA includes enhanced uplink channels and rate selection is called enhanced transport format combination (E-TFC) selection when the enhanced dedicated physical data channels (E-DPDCH) are involved. Each E-TFC with its corresponding data rate (based on the transport block size and coding scheme and the transmit time interval (TTI) over which it will be transmitted) has a corresponding targeted power margin (TPM). A TPM indicates the amount of power relative to a power level of some reference channel or signal (e.g., the DPCCH in WCDMA) that is necessary to achieve a desired block error rate (BLER) or frame erasure rate (FER) for that E-TFC. Rate (or E-TFC) selection will depend upon comparing the RPM to the TPM of each E-TFC. Having the RPM exceed the TPM is a sufficient (and sometimes necessary) condition for a TFC or E-TFC to be selected. Other conditions include how much data or information bits are available in a given transmit buffer or queue and the priority of the data or information in the transmit buffer or queue. Therefore, during E-TFC selection (rate selection) it is important to adjust the RPM by the MPR of each candidate E-TFC, otherwise an E-TFC might be selected or put in the selected set that cannot meet its BLER target due to the MPR that is applied to the MTPL. In other words, if the PA 250 MPR and the E-TFC MPR are different, then the actual or achieved BLER will deviate from the targeted BLER.

Although transmissions are usually protected against noise, fading, and interference by channel coding such as FEC (Forward Error correction Coding), the reception of a packet may nevertheless fail despite having a desired BLER. Such failure is compensated by retransmission mechanisms such as Automatic Repeat Request (ARQ) and Hybrid ARQ (HARQ) mechanisms. In a system utilizing HARQ, the faulty packet and the retransmitted packet can be combined to increase the probability that the information of the packet is properly received. According to the OSI (Open Standards Interconnect) protocol model, the HARQ function can be included in a physical layer or in a MAC (Medium Access Control) layer of the radio system, both layers residing below an RLC (Radio Link Control) layer. In this case, the communicated packets can be considered protocol data units (PDU) of the MAC layer. When an enhanced uplink DCH (Dedicated CHannel) of the WCDMA system is used, reordering is proposed to be performed in a MAC-e layer below a MAC-d layer. The enhanced uplink dedicated channel (E-DCH) of the WCDMA radio system of the embodiment proposes utilizing the HARQ mechanism.

In newer specifications for WCDMA, there are at least five channels which need to be supported for uplink transmission (the dedicated physical control channel (DPCCH), the dedicated physical data channel (DPDCH), the high speed dedicated physical control channel (HS-DPCCH), the enhanced dedicated physical control channel (E-DPCCH), and the enhanced dedicated physical data channel (EDPDCH)). Each channel has a corresponding gain factor ($\beta c$, $\beta d$, $\beta hs$, $\beta ec$, $\beta ed$) determining the amount of power each channel is allocated and each channel has a corresponding spreading factor, I or Q branch assignment, and channelization code. In addition, there can be 1, 2, or 4 E-DPDCHs. Many thousands of different transmitter configurations are possible given the range of values possible for the gain parameters, number of codes, and spreading factors. In accordance with various embodiments, some amount of error in the E-TFC or TFC MPR estimate can be tolerated where it deviates from the PA MPR value for a given transmitter configuration. Since these deviations result in only a small increase in BLER in some cases then it is possible to map the many thousands of different transmitter configurations into a relatively small coarse lookup table to aid the E-TFC or TFC selection process. In so doing, the size and amount of time the PA MPR exceeds the E-TFC or TFC MPR (i.e., power clipping occurs) can be made quite small for the most likely used transmitter configurations. In WCDMA, HARQ is supported for services transported with E-DPDCHs (i.e., sent via the Enhanced Dedicated Channel (E-DCH) which is transported on E-DPDCHs) such that, if for some transmitter configurations clipping is large enough for a block error to occur, then fast HARQ retransmissions can be used to avoid excessive packet delay.

Referring to FIG. 3, formation of packets having a TBS and transmission characteristics (e.g., TTI, E-TFC and MPR) in accordance with the present embodiment begins by determining if there is any scheduled grants and/or non-scheduled grants to be transmitted 302 or if there is any scheduling information to be transmitted 304. When there is only scheduling information to be transmitted 304, a control-only HARQ profile is selected 306, a MAC-e PDU is filled with the scheduling information 308, and the smallest E-TFC is selected 310. The scheduling information packet is then queued 312 for providing in the transmission stream to the transmitter circuitry 108 for transmission therefrom and processing returns to prepare the next packet for transmission.

When non-scheduled grants and/or scheduled grants are to be transmitted 302, the MAC-d flow that allows the highest priority data to be transferred is identified 314 and, in response to the MAC-d flow identified, MAC-d flow(s) are selected 316 for the packet. Based on the HARQ profile of the MAC-d flow(s) selected, a HARQ profile power offset is determined and along with the per E-TFC reference power offset (e.g. the E-DPDCH to DPCCH power margin needed to achieve 10% BLER) a targeted power margin (TPM) (HARQ profile power offset plus E-TFC reference power offset) can be determined for each E-TFC. Along with the TPM, a maximum allowed power ratio (MAPR) (e.g., E-DCH to DPCCH power ratio) based on the absolute grant received from the serving cell and relative grants from the cells in the E-DCH active set is calculated 318. Based on the power left over after TFC selection and after accounting for E-TFC MPR via a lookup table a remaining power margin can (RPM) can be computed for each E-TFC 320.

A comparison of MAPR and RPM and TPM for each E-TFC on a per slot basis is then used to determine if the E-TFC may be supported 322. The transport block size for the maximum E-TFC supported is the maximum supported payload. The $j^{th}$ E-TFC is in the supported set if MIN(RPM(j), MAPR) exceeds TPM(j) for some number of consecutive comparisons instances. In one embodiment only one successful comparison (i.e., MIN(RPM(j),MAPR) exceeds TPM(j)) instance is needed for the $j^{th}$ E-TFC to be in the supported set. Target power margin is dependent on the E-TFC and its targeted BLER or QoS (i.e., TPM=HARQ profile power offset+reference power offset). The RPM for the $j^{th}$ E-TFC is calculated using the channel gain factors in accordance with the following $$RPM_j(N^+) = 10 \cdot \log_{10}\left(\frac{\beta_{max,j}^2}{\beta_c^2} - \frac{\beta_c^2 + \beta_d^2 + \beta_{ec}^2 + \beta_{hs}^2}{\beta_c^2}\right)_{(N^+)}$$

where $$\frac{\beta_{max,j}^2}{\beta_c^2} = 10^{((P_{MAX}-P_{DPCCH}(N-1))/10)} 10^{(-MPR_{lut}(j)/10)}$$

$$P_{DPCCH}(N-1) \cong$$

$$P_{MEAS}(N-1) - 10\log_{10}\left(\frac{(\beta_c^2 + \beta_d^2 + \beta_{hs}^2 + \beta_{ed}^2 + \beta_{ec}^2)}{\beta_c^2}\right)_{(N-1)}$$

and where $P_{MEAS}$ (N−1) is the UE transmit power at slot "N−1"; and $P_{MAX}$={e.g. for a class 3 UE (24 dBm), or $P_{MAX}$=24−30=−6 dBW};

$MPR_{lut}(j)$ is the maximum power reduction due to PA backoff for the $j^{th}$ E-TFC and is determined from a lookup table such as given by FIG. 4;

$\beta_{ed}$ is the gain factor for the E-DPDCH; and $\beta_{ec}$ is the gain factor for the E-DPCCH.

The TPM for the $j^{th}$ E-TFC is calculated as follows:

$$TPM_j = 10\log_{10}\left(\frac{\beta_{ed,j,uq}^2}{\beta_c^2}\right)$$

$$\frac{\beta_{ed,j,uq}}{\beta_c} = \frac{\beta_{ed,ref}}{\beta_c} \sqrt{\frac{L_{e,ref}}{L_{e,j}}} \sqrt{\frac{K_{e,j}}{K_{e,ref}}} \cdot 10^{\left(\frac{\Delta_{harq}}{20}\right)}$$

$$\frac{\beta_{ed,ref}}{\beta_c} = 10^{\left(\frac{\Delta_{E\text{-}DPDCH}}{20}\right)}$$

where
$L_{e,j}$ is the number of code channels of the $j^{th}$ E-TFC;
$L_{e,ref}$ is the number of code channels of reference E-TFC
$K_{e,j}$ is the number of data bits of the $j^{th}$ E-TFC;
$K_{e,ref}$ is the number of data bits of reference E-TFC;
$\Delta_{HARQ}$ is the HARQ profile power offset; and
$\Delta_{E-DPDCH}$ is the power offset of the reference E-TFC.

The power backoff requirements used in calculating the RPM are selected 324 from a lookup table stored in the memory 112 and pre-calculated from various criteria. Table 1 (FIG. 4) is an example of a lookup table in accordance with the embodiment which shows how E-TFC attributes such as channel gain values ($\beta c$, $\beta d$, $\beta hs$, $\beta ec$, $\beta ed$) and number of E-DPDCH codes and corresponding minimum spreading factor (SF) can be used to look up MPR values in a table. In Table 1 (FIG. 4), the expected operation region (EOR) is the $\beta ed/\beta c$ region (e.g., $\beta ed/\beta c > 2$) where it is expected that 99.99% of the E-TFCs will be selected from. The EOR $\beta ed/\beta c$ (or EOR Bed/Bc) refers to the $\beta ed/\beta c$ ratio expected for the minimum possible data rate or transport block size sent on the E-DPDCH(s) that might be selected for each case. In another embodiment, no EOR region is used such that there is only a single MPR column and hence only one MPR per Table row. Next, for each TTI at timeslot M, a maximum supported E-TFC is selected 324 from the supported set of E-TFCs that fulfill additional criteria. The time between when the E-TFC is selected (at slot M) and when it is transmitted (at time M+) would be determined by the choice of N for an N-channel stop-and-wait HARQ protocol. For example, N=8 for 2 ms TTI and N=4 for 10 ms TTI, where the minimum processing time of the processor 110 is approximately 8 slots for the 2 ms TTI case and 12.5 slots for the 10 ms TTI case, and where each slot is of length 0.67 ms. The related power is specified by MIN(RPM(M−k), MAPR)>TPM where k≦6 (k=6 means the RPM was based on a slot power measurement taken 6×0.67 ms ago). Additional criteria for E-TFC selection are that the data buffer size exceeds the transport block size of a selectable E-TFC and the total power required, $P_{TOTAL}$, does not exceed $P_{MAX}-MPR_{lut}(j)$, that is, $$P_{TOTAL} \leq P_{MAX} - MPR_{lut}(j),$$

where $$P_{TOTAL} \cong P_{MEAS}(M-k) - 10\log_{10}\left(\frac{(\beta_c^2 + \beta_d^2 + \beta_{hs}^2 + \beta_{ed}^2 + \beta_{ec}^2)}{\beta_c^2}\right)_{(M-k)} +$$
$$10\log_{10}\left(\frac{(\beta_c^2 + \beta_d^2 + \beta_{hs}^2 + \beta_{ed}^2 + \beta_{ec}^2)}{\beta_c^2}\right)_{(M^+)}$$

and $$\beta_{ed} = \beta_{ed,j,uq}$$

The maximum portable communication devices' transmission power limit (i.e. the adjusted or modified MTPL where MTPL is also called $P_{MAX}$) is set 326 based on the transmitter configuration used for the selected E-TFC and TFC and is given by $P_{MAX}-MPR$. MPR (or the PA MPR) is the maximum power reduction for transmitter configuration of the selected E-TFC and TFC. One definition of MPR is MPR=CM−REL5REFCASE where CM is the cubic metric of the E-TFC transmitter configuration and REL5REFCASE corresponds to CM for ($\beta_c/\beta_d$=12/15, $\beta_{hs}/\beta_c$=24/15) which is 1 dB for CM slope=1/1.85.

If no scheduling information is to be transmitted 328, the packet along with the TBS and TTI is queued 312 for provision to the transmitter circuitry and processing returns to step 302 to prepare the next packet for transmission. If scheduling information is also to be transmitted 328, the scheduling information is added to the packet 330 and the packet is queued 312.

While Table 1 (FIG. 4) has twelve cases for MPRs for various criteria, the number of cases could be as many or as few as a user dictates, based upon processing speed and the time between packet formation and packet transmission (which is greatly improved by using a lookup table as opposed to calculation of MPRs).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method in a wide band code division multiple access (WCDMA) enabled portable communication device for data rate selection of a data transmission on a radio frequency (RF) WCDMA channel, the portable communication device comprising transmitter circuitry including a power amplifier, the method comprising:
    determining a power backoff requirement for the power amplifier for the data transmission on the RF WCDMA channel in response to one or more transmission power criteria selected from the group of transmission power criteria including Maximum Allowed Power Ratio (MAPR), Targeted Power Margin (TPM), and Remaining Power Margin (RPM); and
    selecting a transport format combination (TFC) for the data transmission on the RF WCDMA channel in response to the power backoff requirement.

2. The method of claim 1 wherein selecting a TFC for the data transmission comprises:
    selecting an enhanced TFC (E-TFC) for the data transmission on one of a set of enhanced dedicated physical control channel (E-DPCCH) WCDMA channel and enhanced dedicated physical data channel (E-DPDCH) WCDMA channel in response to the power backoff requirement.

3. The method of claim 1 wherein selecting a TFC for the data transmission comprises:
    performing rate selection for a databurst transmission on the WCDMA channel in response to the power backoff requirement.

4. The method of claim 1 wherein determining a power backoff requirement comprises:
    calculating a first number of predetermined power backoff requirements for each of a second number of data rate selection criteria, wherein each of the first number of power backoff requirements is calculated in response to at least one of the MAPR, the TPM, or the RPM;
    storing a table having the first number of rows;
    determining values for each of the data rate selection criteria in accordance with the data transmission and the RF channel; and determining the power backoff requirement in response to the values for each of the data rate selection criteria.

5. The method of claim 4 wherein the first number is less than twenty.

6. The method of claim 5 wherein the first number is ten.

7. The method of claim 4 wherein each of the data rate selection criteria includes one or more RF channel gain factors.

8. The method of claim 7 wherein the one or more RF channel gain factors includes a dedicated physical data channel (DPDCH) gain factor.

9. The method of claim 7 wherein the one or more RF channel gain factors includes a high speed dedicated physical control channel (HS-DPCCH) gain factor.

10. The method of claim 4 wherein each of the data rate selection criteria includes a channel spreading factor of an RF WCDMA channel.

11. The method of claim 4 wherein the data transmission on the RF channel comprises a WCDMA transmission having the data transmission encoded in a number of codes on an enhanced dedicated physical data WCDMA (E-DPDCH) channel, and wherein each of the data rate selection criteria includes the number of codes.

12. A wide band code division multiple access (WCDMA) enabled portable communication device comprising:
    an antenna for receiving and transmitting radio frequency (RF) signals;
    transmitter circuitry including a power amplifier and coupled to the antenna, wherein the transmitter circuitry receives signals and generates modulated signals therefrom;
    a processor for determining a power backoff requirement for the power amplifier for a WCDMA data transmission to be transmitted on a WCDMA RF channel in response to data rate selection criteria including one or more WCDMA channel gain factors and including transmission power criteria including one or more of Maximum Allowed Power Ratio (MAPR), Targeted Power Margin (TPM), or Remaining Power Margin (RPM), the processor generating a power backoff signal and performing rate selection in response to the power backoff requirement of the WCDMA data transmission, the processor thereafter providing the WCDMA data transmission to the transmitter circuitry for generating modulated signals therefrom; and
    a power controller coupled to the processor for receiving the power backoff signal therefrom, wherein the power controller is also coupled to the power amplifier to control the power amplifier in accordance with the power backoff signal while the processor provides the WCDMA data transmission to the transmitter circuitry for generating modulated signals therefrom.

13. The portable communication device of claim 12 further comprising a storage device coupled to the processor for storing a first number of predetermined power backoff requirements for each of a second number of data rate selection criteria, wherein the processor selects one of the predetermined power backoff requirements for the WCDMA data transmission in response to values determined for each of the data rate selection criteria, and further wherein the processor performs rate selection for the WCDMA data transmission in response to the one of the predetermined power backoff requirements selected.

14. The portable communication device of claim 13 wherein the first number is less than twenty.

15. The portable communication device of claim 13 wherein each of the data rate selection criteria includes a channel spreading factor of the WCDMA channel.

16. The portable communication device of claim 13 wherein each of the data transmissions on the WCDMA RF channel comprises a WCDMA transmission having the WCDMA data transmission encoded in a number of codes on an enhanced dedicated physical data WCDMA channel (E-DPDCH), and wherein the data rate selection criteria includes the number of codes.

17. A wide band code division multiple access (WCDMA) enabled portable communication device comprising:
    an antenna for receiving and transmitting WCDMA radio frequency (RF) signals;
    transmitter circuitry including a power amplifier and coupled to the antenna, wherein the transmitter circuitry receives encoded WCDMA signals and generates modulated WCDMA signals therefrom, the transmitter circuitry providing the modulated WCDMA signals to the antenna for transmission therefrom as WCDMA RF signals; and
    a processor determining a power backoff requirement for the power amplifier for a data transmission to be transmitted on an RF channel in response to one or more transmission power criteria associated with the RF channel, the one or more transmission power criteria selected from the group of transmission power criteria including Maximum Allowed Power Ratio (MAPR), Targeted Power Margin (TPM), and Remaining Power Margin (RPM) and selecting an enhanced transport format combination (E-TFC) in response to the power backoff requirement of the data transmission, wherein the processor is coupled to the power amplifier to control the power amplifier in accordance with the power backoff requirement while providing the data transmission as encoded WCDMA signals to the transmitter circuitry.

18. The WCDMA enabled portable communication device of claim 17 further comprising a memory coupled to the processor and storing a table having rows for a first number of predetermined power backoff requirements and columns for each of a second number of data rate selection criteria, wherein each of the first number of predetermined power backoff requirements is determined in response to at least one of the MAPR, the TPM, or the RPM associated with the RF channel, and wherein the processor utilizes the table to select one of the predetermined power backoff requirements for the data transmission in response to values determined from the data transmission for each of the data rate selection criteria thereof, and further wherein the processor performs rate selection for the encoded WCDMA signals in response to the one of the predetermined power backoff requirements selected.

* * * * *